(12) United States Patent
Kataria et al.

(10) Patent No.: US 10,529,030 B2
(45) Date of Patent: Jan. 7, 2020

(54) SYSTEM AND METHOD FOR LABELING MESSAGES FROM CUSTOMER-AGENT INTERACTIONS ON SOCIAL MEDIA TO IDENTIFY AN ISSUE AND A RESPONSE

(71) Applicant: Xerox Corporation, Norwalk, CT (US)

(72) Inventors: Saurabh Singh Kataria, Rochester, NY (US); Arvind Agarwal, Rochester, NY (US)

(73) Assignee: Conduent Business Services, LLC, Dallas, TX (US)

(*) Notice: Subject to any disclaimer, the term of this patent is extended or adjusted under 35 U.S.C. 154(b) by 260 days.

(21) Appl. No.: 14/593,530

(22) Filed: Jan. 9, 2015

(65) Prior Publication Data
US 2016/0203566 A1 Jul. 14, 2016

(51) Int. Cl.
| | | |
|---|---|---|
| *G06Q 50/00* | (2012.01) | |
| *G06Q 30/00* | (2012.01) | |
| *G06Q 30/02* | (2012.01) | |
| *G06Q 10/06* | (2012.01) | |
| *H04L 12/58* | (2006.01) | |

(52) U.S. Cl.
CPC ....... *G06Q 50/01* (2013.01); *G06Q 10/06398* (2013.01); *G06Q 30/016* (2013.01); *G06Q 30/0201* (2013.01); *H04L 51/16* (2013.01); *H04L 51/32* (2013.01); *H04L 51/02* (2013.01)

(58) Field of Classification Search
None
See application file for complete search history.

(56) References Cited

U.S. PATENT DOCUMENTS

| | | | | |
|---|---|---|---|---|
| 5,754,842 | A * | 5/1998 | Minagawa | G06F 17/5045 700/97 |
| 2004/0068431 | A1* | 4/2004 | Smith | G06Q 10/06311 705/7.14 |
| 2008/0059152 | A1* | 3/2008 | Fridman | G06F 17/2735 704/9 |
| 2013/0051548 | A1* | 2/2013 | Chavez | G06Q 10/101 379/265.09 |
| 2014/0379616 | A1* | 12/2014 | Sun | G06Q 10/101 706/11 |
| 2015/0032724 | A1* | 1/2015 | Thirugnanasundaram | G06F 17/30654 707/722 |

(Continued)

OTHER PUBLICATIONS

Jiayu et al. "Clustered Multi-Task Learning Via Alternating Structure Optimization", 2011, Published in Neural Information Processing System Cconference.*

*Primary Examiner* — Aaron N Strange
*Assistant Examiner* — Mohammad Yousuf A. Mian

(57) ABSTRACT

A system, method and non-transitory computer readable medium for labeling a plurality of messages from a customer-agent interaction on a social media service to identify an issue and a response are disclosed. For example, the system includes a conversation interface, a conversation database coupled to the conversation interface, a conversation analysis server coupled to the conversation database and a conversation knowledge repository coupled to the conversation analysis server. The conversation analysis server includes a preprocessing module, a dialogue act analysis module, an issue status analysis module and an issue/response identification module.

8 Claims, 4 Drawing Sheets

(56) References Cited

U.S. PATENT DOCUMENTS

2016/0042359 A1\* 2/2016 Singh .................. G06Q 30/016
  704/2
2016/0196561 A1\* 7/2016 Iyer ....................... G06Q 50/01
  705/304

\* cited by examiner

SYSTEM AND METHOD FOR LABELING MESSAGES FROM CUSTOMER-AGENT INTERACTIONS ON SOCIAL MEDIA TO IDENTIFY AN ISSUE AND A RESPONSE

The present disclosure relates to customer relationship management strategies and, more particularly, to a system and method for labeling messages from customer-agent interactions on social media to identify an issue and a response.

BACKGROUND

Popular social media services, such as Twitter® and Facebook® offer a means to consumers to voice their opinions and share their experiences with different consumer products and services. Consequently, they can influence the opinion of other people in their social networks about the respective products and services. Such consumer-to-consumer communication facilitated by social media services can greatly impact a company's reputation and sales. Thus, it is important for business organization to consider the social media phenomenon and monitor the customer opinions on these social media services.

However, monitoring these social media services is difficult due to the asynchronous and many-to-many interactions among users and agents of the business organizations. In addition, the sheer volume of opinions generated by consumers on the social media services makes it difficult for agents of a business organization to manually monitor the social media services.

SUMMARY

According to aspects illustrated herein, there are provided a system, a method and a non-transitory computer readable medium for labeling a plurality of messages from a customer-agent interaction on a social media service to identify an issue and a response. One disclosed feature of the embodiments is a system that comprises a conversation interface for facilitating an exchange of messages for the customer-agent interaction on the social media service, a conversation database coupled to the conversation interface for storing the exchange of messages, a conversation analysis server coupled to the conversation database and a conversation knowledge repository coupled to the conversation analysis server for storing the dialogue act label of each one of the messages, the issue status label of each one of the messages, the issue and the response. The conversation analysis server includes a preprocessing module for standardizing the messages, a dialogue act analysis module for labeling the messages with a dialogue act label, an issue status analysis module for labeling the messages with an issue status label and an issue/response identification module for identifying the issue and the response from the messages based on a content of each message of the messages, the dialogue act label and the issue status label.

Another disclosed feature of the embodiments is a method for labeling a plurality of messages from a customer-agent interaction on a social media service to identify and issue and a response. The method comprises receiving a plurality of messages from the customer-agent interaction on the social media service, preprocessing the plurality of messages to standardize words in each one of the plurality of messages and extract one or more features, labeling each one of the plurality of messages with a dialogue act label and an issue status label and identifying the issue and the response for the plurality of messages based on the dialogue act label, the issue status label and a content in each one of the plurality of messages.

Another disclosed feature of the embodiments is a non-transitory computer-readable medium having stored thereon a plurality of instructions, the plurality of instructions including instructions, which when executed by a processor, cause the processor to perform operations comprising receiving a plurality of messages from the customer-agent interaction on the social media service, preprocessing the plurality of messages to standardize words in each one of the plurality of messages and extract one or more features, labeling each one of the plurality of messages with a dialogue act label and an issue status label and identifying the issue and the response for the plurality of messages based on the dialogue act label, the issue status label and a content in each one of the plurality of messages.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for labeling messages from customer-agent interactions on social media. As discussed above, social media services offer a means to consumers to voice their opinions and share their experiences with different consumer products and services. Consequently, they can influence the opinion of other people in their social networks about the respective products and services. Such consumer-to-consumer communication facilitated by social media services can greatly impact a company's reputation and sales. Thus, it is important for business organization to consider the social media phenomenon and monitor the customer opinions on these social media services.

However, monitoring these social media services is difficult due to the asynchronous and many-to-many interactions among users and agents of the business organizations. In addition, the sheer volume of opinions generated by consumers on the social media services makes it difficult for agents of a business organization to manually monitor the social media services.

Embodiments of the present disclosure provide a novel system and method for labeling messages from customer-agent interactions on social media. The embodiments of the present disclosure improve functioning of a computer to automatically label messages exchanged in the customer-agent interactions and use the labels to automatically identify issues and responses to the issues. The labels, identified issues and responses can then be stored and used for further learning in analyzing future customer-agent interactions.

Figure 1:
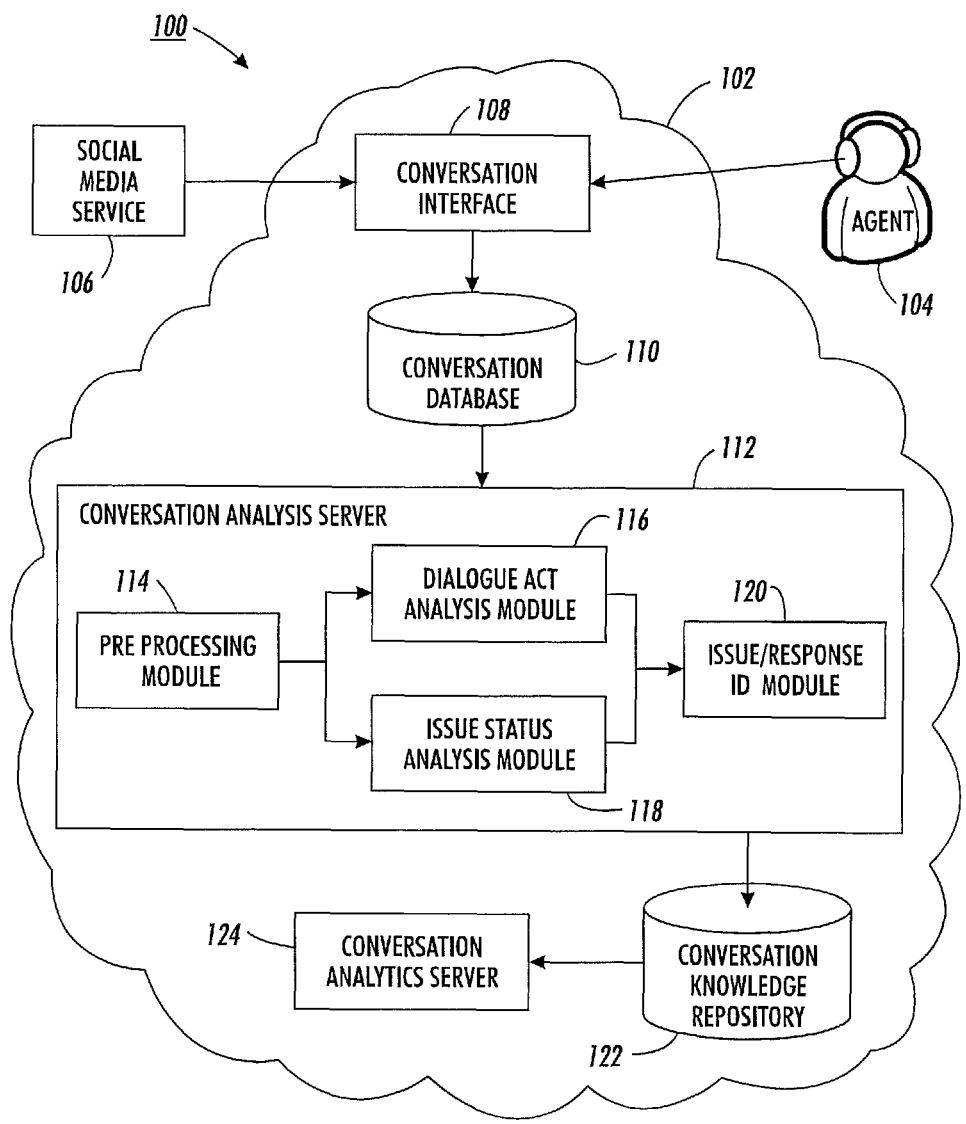
FIG. 1 illustrates one embodiment of a block diagram of a system of the present disclosure.

FIG. 1 illustrates an example system 100 of the present disclosure. In one embodiment, the system 100 includes a communications network 102. In one embodiment, the communications network 102 may be any type of communications network including, for example, an Internet Protocol (IP) network, a cellular network, a broadband network, and the like.

In one embodiment, the communications network 102 may include other network elements and access networks not shown. For example, the communication network 102 may include other network elements such as a firewall, border elements, gateways, and the like. The communication network 102 may also have additional access networks, such as for example, a cellular access network, a broadband access network, and the like.

In one embodiment, the system 100 may include a social media service 106. Although only a single social media service 106 is illustrated in FIG. 1, it should be noted that any number of social media services 106 may be deployed. The social media service 106 may be a website that allows users or customers to post short messages via the website. Example websites of social media services may include Facebook®, Twitter® and the like. As discussed above, the social media service 106 may be a forum that customers use to publicly discuss their opinions on products or services sold by a business organization.

In one embodiment, an agent 104 of a business organization may be monitoring messages posted by customers on the social media service 106. Although only a single agent 104 is illustrated in FIG. 1, it should be noted that any number of agents 104 may be deployed. In one embodiment, when the agent 104 identifies messages that are directed towards the business organization, the agent may engage the user of the social media service 106 via a conversation interface 108.

In one embodiment, the conversation interface may be hardware device (e.g., a computer and monitor display) that facilitates an exchange of messages for a customer-agent interaction on the social media service 106. For example, the conversation interface 108 may allow the agent 104 to view the messages posted by the customer on the social media service 106 and allow the agent 104 to respond on the social media service 106 via the conversation interface 108.

In one embodiment, a plurality of different customer-agent interactions on one or more different social media services 106 may be occurring simultaneously via the conversation interface 108. For example one agent may be having a customer-agent interaction on a first social media service and another agent may be having another customer-agent interaction on a second social media service.

In one embodiment, the plurality of messages that are generated for each customer-agent interaction may be stored in a conversation database 110 that is communicatively coupled to the conversation interface. In one embodiment, the plurality of messages may be streamed to the conversation database 110 as the customer-agent interaction is occurring. In other words, as a message is generated via the conversation interface 108, the message may also be streamed to the conversation database 110 and stored.

In one embodiment, a conversation analysis server 112 may be coupled to the conversation database 110. In one embodiment, the conversation analysis server 112 may select one or more messages from a customer-agent interaction analysis and labeling. In another embodiment, the conversation analysis server 112 may analyze and label all of the messages for each one of the customer-agent interactions stored in the conversation database 110. In one embodiment, the conversation analysis server 112 may analyze and label the messages as they are streamed to the conversation database 110 in a parallel or in real-time.

Figure 4:
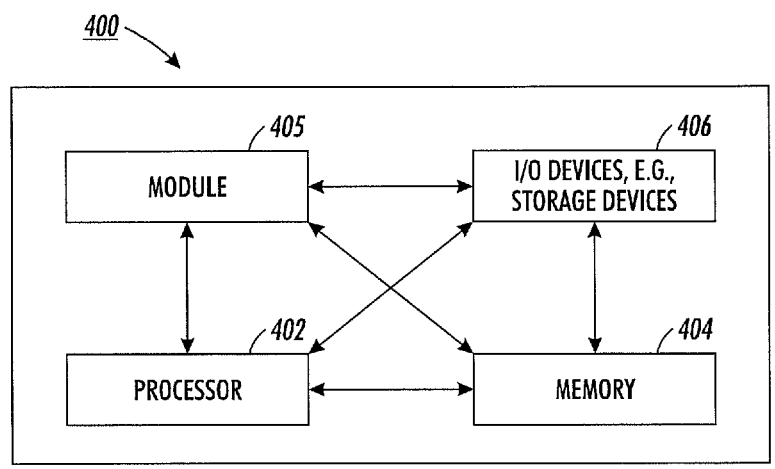
FIG. 4 illustrates a high-level block diagram of a computer suitable for use in performing the functions described herein.

In one embodiment, the conversation analysis server 112 may include a preprocessing module 114, a dialogue act (DA) analysis module 116, an issue status (IS) analysis module 118 and an issue/response identification (ID) module 120. In one embodiment, the conversation analysis server 112 may be deployed as a modified computer that is improved to perform the functions described herein as illustrated in FIG. 4 and discussed below.

In one embodiment, the preprocessing module 114 standardizes each one of the plurality of messages and extracts features from each one of the plurality of messages. Standardizing may include expanding abbreviations into words (e.g., IDK to I don't know), convert slang abbreviations to words (e.g., 2mrw to tomorrow), convert emoticons to words (e.g., ☺ to happy or smiley face), convert ASCII images to words (e.g., <3 to love), and the like. Feature extraction may construct various language and non-language features from words. For example, the features may be from emoticons, hashtags, identification of conversation actors (e.g. who is talking), and the like.

In one embodiment, the dialogue act analysis module 116 may label each message with a dialogue act label. In one embodiment, the dialogue act labels may include Complaint (e.g., "I hate my cell carrier's service"), Answer (e.g., an answer to a question or request), Receipt (e.g., indicating that the complaint, question, compliment, thanks or other types of message was received), Compliment (e.g., "you guys have the best service!", Response (e.g., responding "you're welcome" to a thank you from a customer), Request (e.g., a message indicating the customer needs something or has a question), Greeting (e.g., hello, how are you, and the like), Thank (e.g., "thank you"), Announcement (e.g., a neutral statement or a message that simply states a fact such as "I like phones from brand X"), Solved (e.g., a message that proposes a solution to a request) and Other (e.g., any message that does not fit one of the above categories).

In one embodiment, the issue status analysis module 118 may label each message with an issue status label. In one embodiment, the issue status labels may include Open (e.g., a request was issued by a customer that has not been resolved), Closed (e.g., the request was closed without resolution or a solution to the request did not exist), Solved (e.g., a solution or an answer to the customer's request was issued) and Change-Channel (e.g., the interaction was moved to another social media service or form of communication).

In one embodiment, the dialogue act label and the issue status label may be predicted simultaneously using a multitask method. For example, if $x=(x_1, x_2, \ldots x_t)$ are messages in a given agent-customer interaction, with $y=(y_2, y_2, \ldots y_t)$ and $z=(z_1, z_2, \ldots z_t)$ as the dialogue act labels and the issue status labels, respectively, then a multitask structured prediction problem may formulated. More specifically, the structured prediction problem is modeled by considering two types of cliques. The first type of clique, similar to a linear chain CRF, consists of adjacent labels in one of any sequence, e.g., $(y_{t-1}, y_t)$ along with current $x_t$, e.g., $(x_t, y_{t-1}, y_t)$ and the second clique consists of a pair of labels $(y_t, z_t)$ along with current $x_t$, e.g., $(x_t, y_t, z_t)$. Here the first type of clique provides the independence, while the second type of clique provides the benefit from other labels. Two models, e.g., one for each of the dialogue act label and the issue status label, are learned by maximizing the joint log likelihood of the data.

In one embodiment, both models are provided below:

$$p^y(y, z \mid x, \theta^y, \psi^y) = \frac{1}{U^y(x)} \prod_{t=1}^{T} \left( \underbrace{\Phi(y_{t-1}, y_t, x_t) \mid \theta^y}_{\text{task } y \text{ factor}} - \underbrace{\Phi(y_t, y_t, x_t) \psi^y}_{\text{label dependency factor}} \right)$$

$$p^z(y, z \mid x, \theta^z, \psi^z) = \frac{1}{U^z(x)} \prod_{t=1}^{T} \left( \underbrace{\Phi(z_{t-1}, z_t, x_t) \mid \theta^z}_{\text{task } z \text{ factor}} - \underbrace{\Phi(y_t, z_t, x_t) \psi^z}_{\text{label dependency factor}} \right)$$

Notably, the parameter $\psi$ is the same (e.g., $\psi^y = \psi^z = \psi$) for both tasks which facilitates the sharing of learning between both tasks.

Since both models are trained and tested on a training data set and the models are a supervised task, annotations are needed for dialogue act label prediction and issue status label prediction using a learning model. The training set is first manually labeled and then the multitask learning model may be applied to the labeled training set to predict newly obtained messages of a customer-agent interaction.

In one embodiment, the issue/response ID module 120 may identify an issue and a response from the plurality of messages based on a content of each message, the dialogue act label and the issue status label. For example, a training set of data may be used for a learning model to learn what types of content in messages with a particular dialogue act label and a particular issue status label indicate an issue and a response from the messages of the customer-agent interaction. For example, the learning models may include any one of a Gaussian Naïve Bayes (NB) classifier, a Multinomial NB classifier, a Bernoulli NB classifier, a random forest classifier or a K nearest neighbor (KNN) classifier. In one embodiment, the Bernoulli NB classifier was found to be the most accurate learning model for predicting the issue and the response from the messages based on the training data set.

Figure 2:
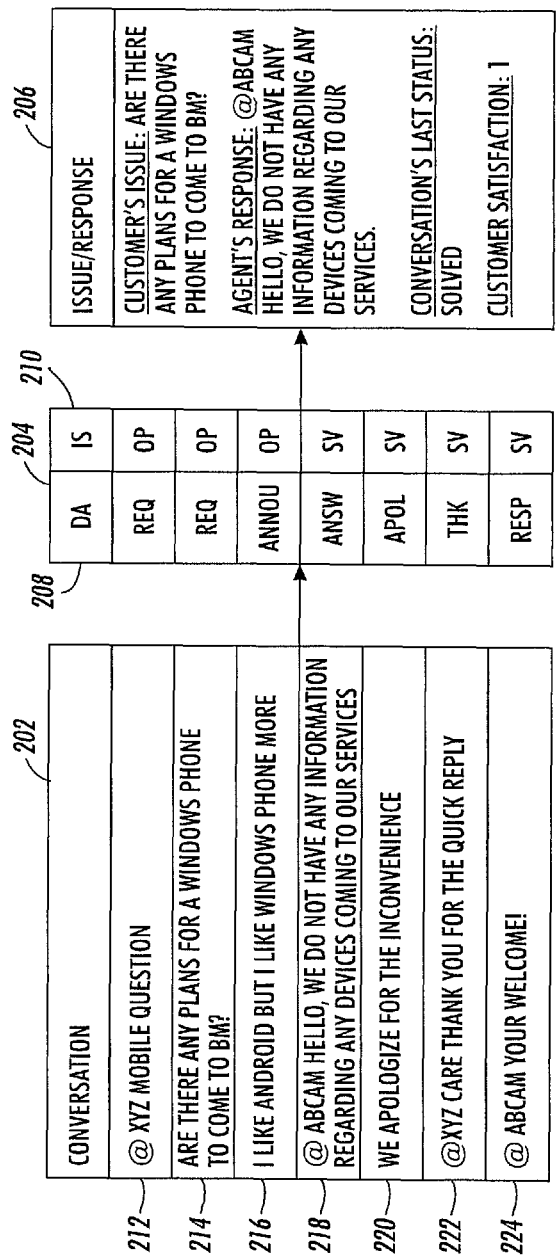
FIG. 2 illustrates an example labeling of the messages of a customer-agent interaction.

FIG. 2 illustrates an example of labeling of messages of a customer-agent interaction. For example, table 202 lists short messages 212, 214, 216, 218, 220, 222 and 224 (also referred to collectively as short messages 212-224) of a customer-agent interaction. In one embodiment, each one of the short messages 212-224 is labeled with a DA label 208 and an IS label 210, as illustrated in a table 204, based on the training model as discussed above.

In one embodiment, based on the content in each one of the short messages 212-224, the DA label 208 and the IS label 210, an issue and a response may be identified as illustrated in table 206. For example, the training model may indicate that an issue may likely have a Request (REQ) DA label 208 and an Open (OP) IS label 210. However, both short messages 212 and 214 have a REQ DA label and an OP IS label. Based on the training model the content of the short message 214 may be identified as the issue based on punctuation (e.g., a question mark), certain words that indicate a request or question (e.g., are there), based on sentence structure, and the like.

Similarly, the training model may indicate that a response may likely have an Answer (ANSW) DA label 208 and a Solved (SV) IS label 210. For example, the short message 218 has an ANSW DA label and a SV IS label. In addition, the content of the short message 218 may be used to confirm that it is a response based on the training model. For example, the content of the short message 218 may include reference to the same subject in the issue, certain sentence construction, and the like. In one embodiment, the table 206 may also include a conversation's last status (e.g., solved) and a customer satisfaction rating (e.g., a numerical score).

Referring back to FIG. 1, the dialogue act labels, the issue status labels, the issue and the response identified for each customer-agent interaction may be stored in a conversation knowledge repository 122. The data stored in the conversation knowledge repository 122 may be used by a conversation analytics server 124 to calculate various customer care performance metrics.

In one embodiment, the conversation analytics may include issues monitoring, issues summary, customer's satisfaction and agent's performance. In one embodiment, issues monitoring may include calculating a issue resolution rate (e.g., agent-customer interactions whose first message was labeled as OPEN and the last message was labeled as SOLVED), identifying properly handled interactions (e.g., agent-customer interactions whose first message was labeled as OPEN and the last message was labeled as SOLVED or CHANGE CHANNEL), identifying assistance interactions (e.g., agent-customer interactions whose first message was had a dialogue act label of REQUEST and an issue status label of OPEN), and the like.

In one embodiment, issues summary may include messages that contain a dialogue act label of COMPLAINT, REQUEST, ANNOUNCEMENT or OPEN. These messages may be assumed to contain salient issues faced by the customer.

In one embodiment, the customers' satisfaction may include a customer conversion rate and a customer hang-up rate. The customer conversion rate may be defined as a fraction of the messages whose first message has a dialogue act label of COMPLAINT or REQUEST and a last message that has a dialogue act label of THANKS, RESPONSE, SOLVED, COMPLIMENT or ANSWER. The customer hang-up rate may be defined as a fraction of messages whose last message has a dialogue act label of COMPLAINT or REQUEST and has no messages having a dialogue act label of THANKS, RESPONSE or COMPLIMENT.

In one embodiment, the agent's performance may be calculated by combining issues monitoring and customers' satisfaction rate on a per agent basis. For example, each agent may be measured based on the issue resolution rate of the issues monitoring and a customer conversion rate of the customers' satisfaction.

Figure 3:
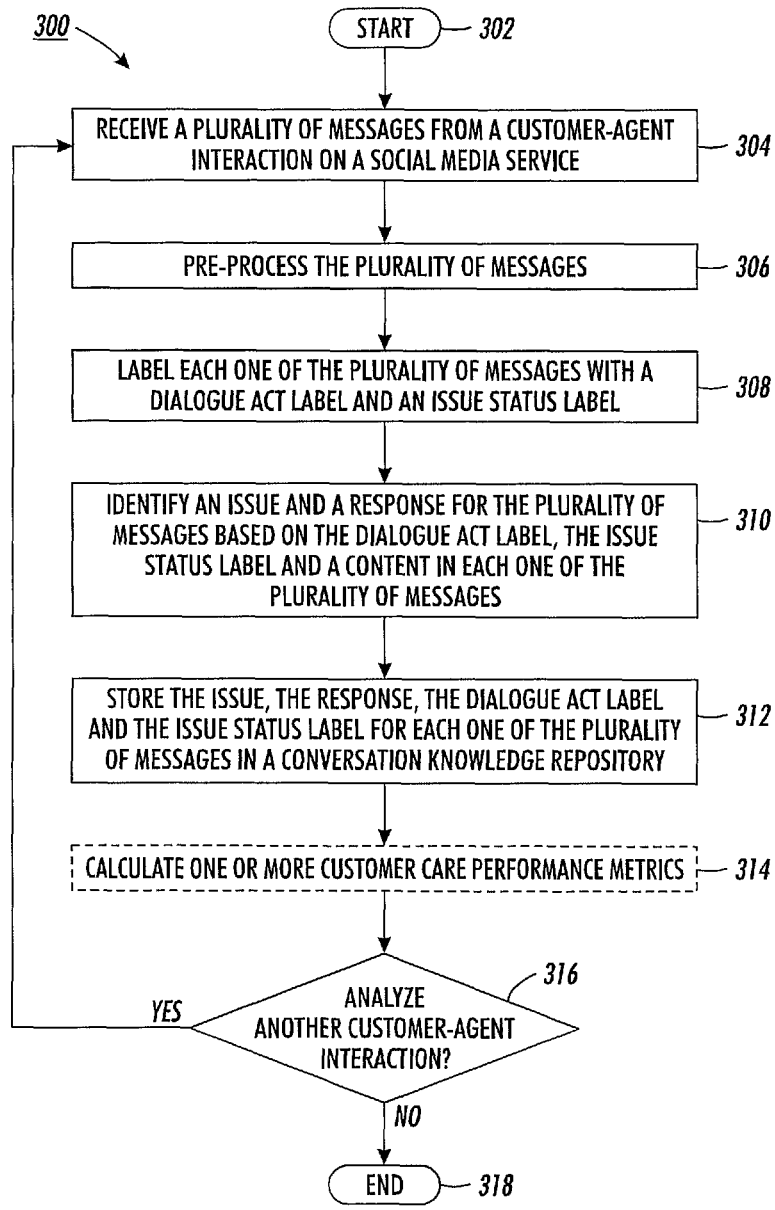
FIG. 3 illustrates a flowchart of one embodiment of a method for labeling messages from customer-agent interactions on social media to identify an issue and a response.

FIG. 3 illustrates a flowchart of a method 300 for labeling messages from a customer-agent interaction on a social media service to identify an issue and a response. In one embodiment, one or more steps or operations of the method 300 may be performed by the endpoint device 120, the AS 104 or a computer as illustrated in FIG. 4 and discussed below.

At step 302 the method 300 begins. At step 304, the method 300 receives a plurality of messages form a customer-agent interaction on a social media service. For example, an agent of a business organization may be monitoring messages posted by customers on the social media service. In one embodiment, when the agent identifies messages that are directed towards the business organization, the agent may engage the user of the social media service via a conversation interface.

At step 306, the method 300 preprocesses the plurality of messages. In one embodiment, a preprocessing module standardizes each one of the plurality of messages and extracts features from each one of the plurality of messages. Standardizing may include expanding abbreviations into words (e.g., IDK to I don't know), convert slang abbreviations to words (e.g., 2mrw to tomorrow), convert emoticons to words (e.g., ☺ to happy or smiley face), convert ASCII images to words (e.g., <3 to love), and the like. Feature extraction may construct various language and non-language features from words. For example, the features may be from emoticons, hashtags, identification of conversation actors (e.g. who is talking), and the like.

At step 308, the method 300 labels each one of the plurality of messages with a dialogue act label and an issue status label. In one embodiment, a dialogue act analysis module may label each message with a dialogue act label. In one embodiment, the dialogue act labels may include Complaint (e.g., "I hate my cell carrier's service"), Answer (e.g., an answer to a question or request), Receipt (e.g., indicating that the complaint, question, compliment, thanks or other types of message was received), Compliment (e.g., "you guys have the best service!"), Response (e.g., responding "you're welcome" to a thank you from a customer), Request (e.g., a message indicating the customer needs something or has a question), Greeting (e.g., hello, how are you, and the like), Thank (e.g., "thank you"), Announcement (e.g., a neutral statement or a message that simply states a fact such as "I like phones from brand X"), Solved (e.g., a message that proposes a solution to a request) and Other (e.g., any message that does not fit one of the above categories).

In one embodiment, an issue status analysis module may label each message with an issue status label. In one embodiment, the issue status labels may include Open (e.g., a request was issued by a customer that has not been resolved), Closed (e.g., the request was closed without resolution or a solution to the request did not exist), Solved (e.g., a solution or an answer to the customer's request was issued) and Change-Channel (e.g., the interaction was moved to another social media service or form of communication). In one embodiment, the dialogue act labels and the issue status labels may be predicted using a multitask learning model.

At step 310, the method 300 identifies an issue and a response for the plurality of messages based on the dialogue act label, the issue status label and a content in each one of the plurality of messages. In one embodiment, an issue/response ID module may identify an issue and a response from the plurality of messages based on a content of each message, the dialogue act label and the issue status label. For example, a training set of data may be used for a learning model to learn what types of content in messages with a particular dialogue act label and a particular issue status label indicate an issue and a response from the messages of the customer-agent interaction. For example, the learning models may include any one of a Gaussian Naïve Bayes (NB) classifier, a Multinomial NB classifier, a Bernoulli NB classifier, a random forest classifier or a K nearest neighbor (KNN) classifier. In one embodiment, the Bernoulli NB classifier was found to be the most accurate learning model for predicting the issue and the response from the messages based on the training data set.

At step 312, the method 300 stores the issue, the response, the dialogue act label and the issue status label for each one of the plurality of messages in a conversation knowledge repository. The data stored in the conversation knowledge repository may be used by a conversation analytics server to calculate customer care performance metrics.

At optional step 314, the method 300 calculates one or more customer care performance metrics. For example, a conversation analytics server may calculate the customer care performance metrics. In one embodiment, the customer care performance metrics may include issues monitoring, issues summary, customer's satisfaction and agent's performance.

At step 316, the method 300 determines if there is another customer-agent interaction that needs to be analyzed. If the answer to step 316 is yes, the method 300 may return to step 304 to receive the next plurality of messages from another customer-agent interaction on a social media service. The method 300 may then repeat steps 304-316.

If the answer to step 316 is no, the method 300 may proceed to step 318. At step 318, the method 300 ends.

As a result, the embodiments of the present disclosure transform messages exchanged between a customer and an agent on a social media service into messages with objective labels that can be used to calculate statistics about issue resolutions, agent performance, and the like. In addition, the labeling of the messages exchanged between the customer and the agent may be used to create a knowledge database.

Furthermore, the embodiments of the present disclosure improve the functioning of an application server or a computer. For example, labels for messages exchanged between the customer and the agent may be generated by the computer that could not otherwise be created without the improvements provided by the present disclosure. In other words, the technological art of analyzing messages exchanged in a customer-agent interaction on a social media service is improved by providing a computer that is modified with the ability to automatically generate labels of the messages exchanged in the customer-agent interaction on the social media service as disclosed by the present disclosure.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the general-purpose computer to identify an issue and a response of a customer-agent interaction on a social media service based on labeled messages of the interaction, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for labeling messages from a customer-agent interaction on a social media service to identify an issue and a response, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)).

Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for labeling messages from a customer-agent interaction on a social media service to identify an issue and a response (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for labeling messages from a customer-agent interaction on a social media service to identify an issue and a response (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for labeling messages from a plurality of different customer-agent interactions on a plurality of different social media services to identify an issue and a response, comprising:
   a conversation interface for facilitating an exchange of the messages for the plurality of different customer-agent interactions on the plurality of different social media services;
   a conversation database coupled to the conversation interface for storing the exchange of the messages, wherein the messages are streamed from the conversation interface to the conversation database as the plurality of different customer-agent interactions are occurring;
   a conversation analysis server coupled to the conversation database, comprising:
      a processor;
      a non-transitory computer readable medium storing instructions that are executed by the processor, the instructions comprising:
      a preprocessing module for standardizing the messages, wherein the standardizing the messages comprises converting abbreviations, emoticons, ASCII images, and slang abbreviations to words;
      a dialogue act analysis module for labeling each of the messages with a dialogue act label, wherein the dialogue act label is selected from a group consisting of: complaint, answer, receipt, compliment, response, request, greeting, thank, announcement, solved, and other;
      an issue status analysis module for labeling each of the messages with an issue status label, wherein the issue status label is selected from a group consisting of: open, closed, solved and change-channel, wherein the dialogue act label and the issue status label are predicted simultaneously using a multi-task method; and
      an issue/response identification module for identifying the issue of a customer and the response of an agent from the messages based on a content of each message of the messages, the dialogue act label and the issue status label;
   a conversation knowledge repository coupled to the conversation analysis server for storing the dialogue act label of each one of the messages, the issue status label of each one of the messages, the issue and the response; and
   a conversation analytics server for performing issues monitoring to calculate an issue resolution rate, identify properly handled interactions, and identify assistance interactions, performing issues summary, calculating customer's satisfaction, and calculating customer care performance metrics to measure a performance of an agent, wherein the issue resolution rate is based on a first message that has the issue status label of open and a last message that has the issue status label of solved, wherein the properly handled interactions are based on the first message that has the issue status label of open and the last message that has the issue status label of solved or change-channel, wherein the assistance interactions are based on the first message that has the dialogue act label of request and the issue status label of open, wherein the issue summary includes the messages that have the dialogue act label of complaint, request, announcement or open, wherein the customer's satisfaction comprises a customer conversion rate and a customer hang-up rate, wherein the customer conversion rate comprises a fraction of the messages that has the first message with the dialogue act label of complaint or request and the last message with the dialogue act label of thanks, response, solved, compliment, or answer, wherein the customer hang-up rate comprises a fraction of the messages that has the last message with the dialogue act label of complaint or request and has no messages having the dialogue act label of thanks, response, or compliment, wherein the customer care performance metrics are calculated based on the dialogue act label, the issue status label, and the issue and the response of the each one of the messages, wherein the customer care performance metrics used to measure the performance of the agent comprise the issue resolution rate, the customer conversion rate, and the customer hang-up rate.

2. The system of claim 1, wherein the conversation analysis server applies a learning model for the dialogue act analysis module, the issue status analysis module and the issue/response identification module.

3. The system of claim 2, wherein the learning model comprises at least one of: a multitask method learning model, a Gaussian Naive Bayes (NB) classifier, a Multinomial NB classifier, a Bernoulli NB classifier, a random forest classifier or a K nearest neighbor (KNN) classifier.

4. A method for labeling messages from a plurality of different customer-agent interactions on a plurality of different social media services to identify an issue and a response, comprising:
　　receiving, by a processor, the plurality of messages from the plurality of different customer-agent interactions on the plurality of different social media services;
　　streaming the messages to a conversation database as the plurality of different customer-agent interactions are occurring;
　　preprocessing, by the processor, the plurality of messages to standardize words in each one of the plurality of messages and to extract one or more features, wherein the preprocessing the plurality of messages to standardize words comprises converting abbreviations, emoticons, ASCII images, and slang abbreviations to words;
　　labeling, by the processor, each one of the plurality of messages with a dialogue act label and an issue status label, wherein the dialogue act label and the issue status label are predicted simultaneously using a multi-task method, wherein the dialogue act label is selected from a group consisting of: complaint, answer, receipt, compliment, response, request, greeting, thank, announcement, solved, and other, wherein the issue status label is selected from a group consisting of: open, closed, solved and change-channel;
　　identifying, by the processor, the issue of a customer and the response of an agent for the plurality of messages based on the dialogue act label, the issue status label and a content in each one of the plurality of messages
　　storing, by the processor, the issue, the response, the dialogue act label for each one of the plurality of messages and the issue status label for each one of the plurality of messages in a conversation knowledge repository;
　　performing issues monitoring to calculate an issue resolution rate, identify properly handled interactions, and identify assistance interactions, wherein the issue resolution rate is based on a first message that has the issue status label of open and a last message that has the issue status label of solved, wherein the properly handled interactions are based on the first message that has the issue status label of open and the last message that has the issue status label of solved or change-channel, wherein the assistance interactions are based on the first message that has the dialogue act label of request and the issue status label of open;
　　performing issues summary, wherein the issue summary includes the messages that have the dialogue act label of complaint, request, announcement or open;
　　calculating customer's satisfaction, wherein the customer's satisfaction comprises a customer conversion rate and a customer hang-up rate, wherein the customer conversion rate comprises a fraction of the messages that has the first message with the dialogue act label of complaint or request and the last message with the dialogue act label of thanks, response, solved, compliment, or answer, wherein the customer hang-up rate comprises a fraction of the messages that has the last message with the dialogue act label of complaint or request and has no messages having the dialogue act label of thanks, response, or compliment; and
　　calculating, by the processor, customer care performance metrics to measure a performance of an agent, wherein the customer care performance metrics are calculated based on the dialogue act label, the issue status label, and the issue and the response of the each one of the messages, wherein the customer care performance metrics used to measure the performance of the agent comprise the issue resolution rate, the customer conversion rate, and the customer hang-up rate.

5. The method of claim 4, wherein the one or more features comprise an emoticon, a feature from a hashtag or a conversation actor.

6. The method of claim 4, wherein the labeling and the identifying are performed using a learning model.

7. The method of claim 6, wherein the learning model comprises at least one of: a multitask method learning model, a Gaussian Naive Bayes (NB) classifier, a Multinomial NB classifier, a Bernoulli NB classifier, a random forest classifier or a K nearest neighbor (KNN) classifier.

8. A method for labeling messages from a plurality of different customer-agent interactions on a plurality of different social media services to identify an issue and a response, comprising:
　　receiving, by a processor, the plurality of messages from the plurality of different customer-agent interactions on the plurality of different social media services initiated by an agent for a business organization based on one or more messages about the business organization on one of the plurality of different social media services;
　　streaming the messages to a conversation database as the plurality of different customer-agent interactions are occurring;
　　preprocessing, by the processor, the plurality of messages to standardize words in each one of the plurality of messages and to extract one or more features, wherein the preprocessing the plurality of messages to standardize words comprises converting abbreviations, emoticons, ASCII images, and slang abbreviations to words;
　　labeling, by the processor, each one of the plurality of messages with an issue status label consisting of: open, closed, solved and change-channel, using a multitask method learning model;
　　labeling, by the processor, each one of the plurality of messages with a dialogue act label consisting of: complaint, answer, receipt, compliment, response, request, greeting, thank, announcement, solved and other, using the multitask method learning model, wherein the dialogue act label and the issue status label are predicted simultaneously using a multi-task method;

identifying, by the processor, the issue of a customer and the response of an agent for the plurality of messages based on the dialogue act label, the issue status label and a content in each one of the plurality of messages using a Bernoulli Naive Bayes classifier learning model;

storing, by the processor, the issue, the response, the dialogue act label for each one of the plurality of messages and the issue status label for each one of the plurality of messages in a conversation knowledge repository;

performing issues monitoring to calculate an issue resolution rate, identify properly handled interactions, and identify assistance interactions, wherein the issue resolution rate is based on a first message that has the issue status label of open and a last message that has the issue status label of solved, wherein the properly handled interactions are based on the first message that has the issue status label of open and the last message that has the issue status label of solved or change-channel, wherein the assistance interactions are based on the first message that has the dialogue act label of request and the issue status label of open;

performing issues summary, wherein the issue summary includes the messages that have the dialogue act label of complaint, request, announcement or open;

calculating customer's satisfaction, wherein the customer's satisfaction comprises a customer conversion rate and a customer hang-up rate, wherein the customer conversion rate comprises a fraction of the messages that has the first message with the dialogue act label of complaint or request and the last message with the dialogue act label of thanks, response, solved, compliment, or answer, wherein the customer hang-up rate comprises a fraction of the messages that has the last message with the dialogue act label of complaint or request and has no messages having the dialogue act label of thanks, response, or compliment; and calculating, by the processor, customer care performance metrics to measure a performance of an agent, wherein the customer care performance metrics are calculated based on the dialogue act label, the issue status label, and the issue and the response of the each one of the plurality of messages, wherein the customer care performance metrics used to measure the performance of the agent comprise the issue resolution rate, the customer conversion rate, and the customer hang-up rate.

* * * * *